(12) United States Patent
Koide

(10) Patent No.: US 7,021,765 B2
(45) Date of Patent: Apr. 4, 2006

(54) ILLUMINATION OPTICAL SYSTEM AND PROJECTION DISPLAY OPTICAL SYSTEM

(75) Inventor: Jun Koide, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/790,977

(22) Filed: Mar. 1, 2004

(65) Prior Publication Data

US 2004/0174595 A1    Sep. 9, 2004

(30) Foreign Application Priority Data

Mar. 7, 2003    (JP)    ............................... 2003-062302

(51) Int. Cl.
*G03B 21/14* (2006.01)
*G02F 1/00* (2006.01)
*G02F 1/1335* (2006.01)
*H04N 5/74* (2006.01)

(52) U.S. Cl. ........................... 353/20; 353/38; 348/751; 348/766; 349/9; 349/96

(58) Field of Classification Search .................. 353/20, 353/30–34, 37, 38, 48, 50, 51, 81, 82, 84, 353/98, 99; 359/237, 242, 244, 246, 251, 359/267, 277, 281, 301, 303, 304, 361, 443, 359/454, 455, 483, 494–497, 722, 723, 885; 348/739, 744, 750, 751, 754, 756, 757, 766; 349/5, 7, 9, 80, 94, 96, 102, 193

See application file for complete search history.

(56) References Cited

U.S. PATENT DOCUMENTS

| | | | |
|---|---|---|---|
| 5,589,726 A | * | 12/1996 | Gold ........................... 313/161 |
| 6,260,972 B1 | * | 7/2001 | Robinson et al. .............. 353/38 |
| 6,412,951 B1 | | 7/2002 | Sawai ........................... 353/31 |

FOREIGN PATENT DOCUMENTS

JP    11-64848    3/1999

* cited by examiner

*Primary Examiner*—W. B. Perkey
*Assistant Examiner*—Rochelle Blackman
(74) *Attorney, Agent, or Firm*—Morgan & Finnegan LLP

(57) ABSTRACT

An illumination optical system is disclosed, which provides a luminous flux with a small incident angle on an illumination surface in one axis direction on a section of the luminous flux. The illumination optical system can suppress a reduction in light amount by a mask provided for a polarization conversion element. The illumination optical system has a light source and an optical integrator. The optical integrator uses a lens array to perform splitting of a luminous flux from the light source. The illumination optical system has the polarization conversion element including a polarization beam splitter array, a plurality of ½ wave plates, and a mask. The light source is a discharge gas exciting arc tube of a DC drive type.

14 Claims, 11 Drawing Sheets

FIG. 7
(A)
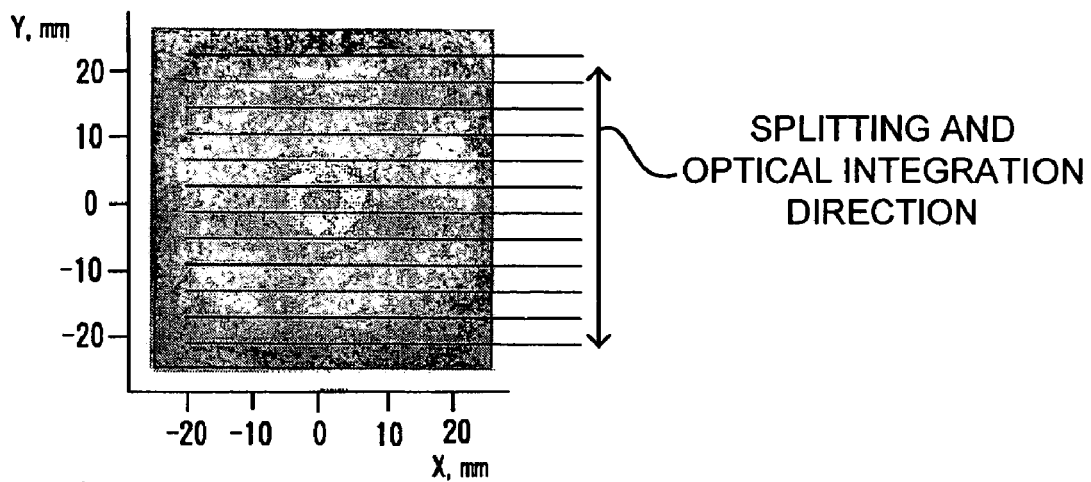
SPLITTING AND OPTICAL INTEGRATION DIRECTION
(B)
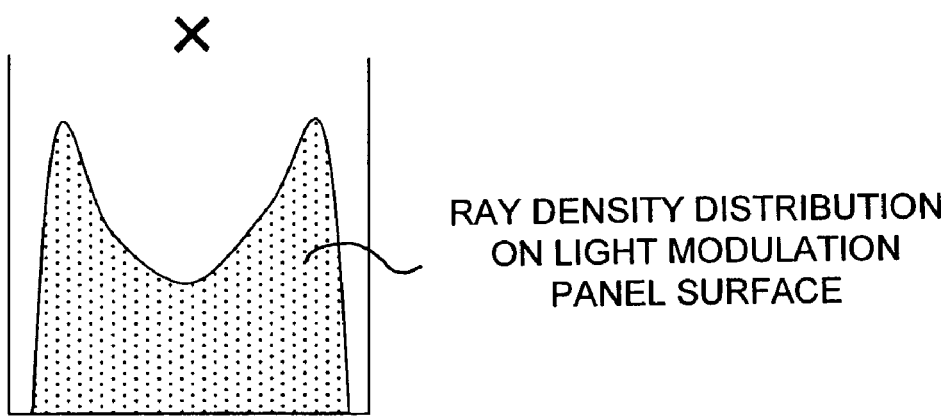
RAY DENSITY DISTRIBUTION ON LIGHT MODULATION PANEL SURFACE
(C)
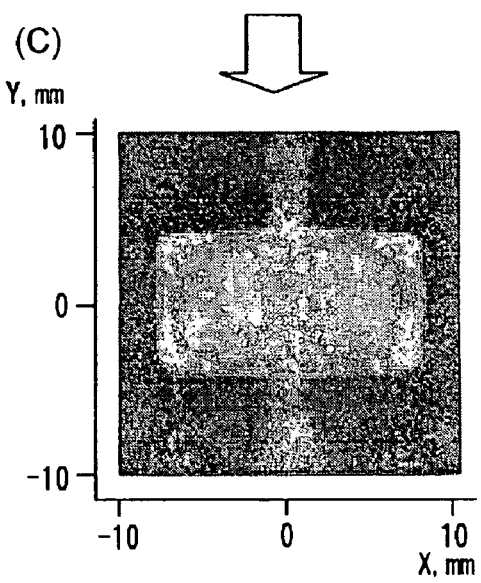

FIG. 8
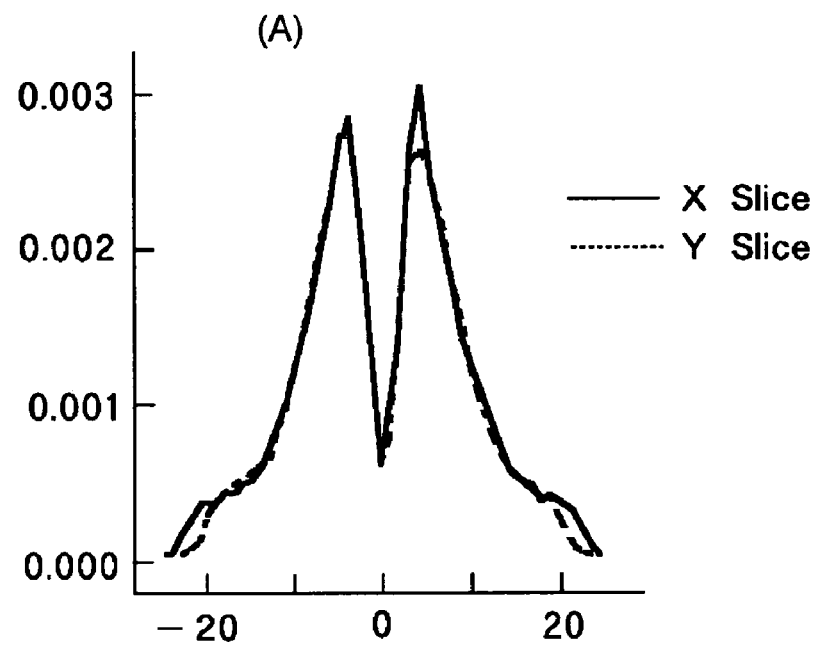
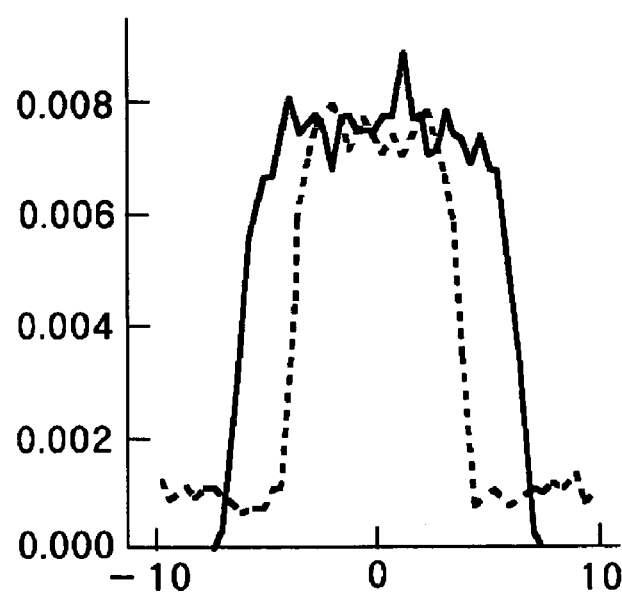

FIG. 9
(A)
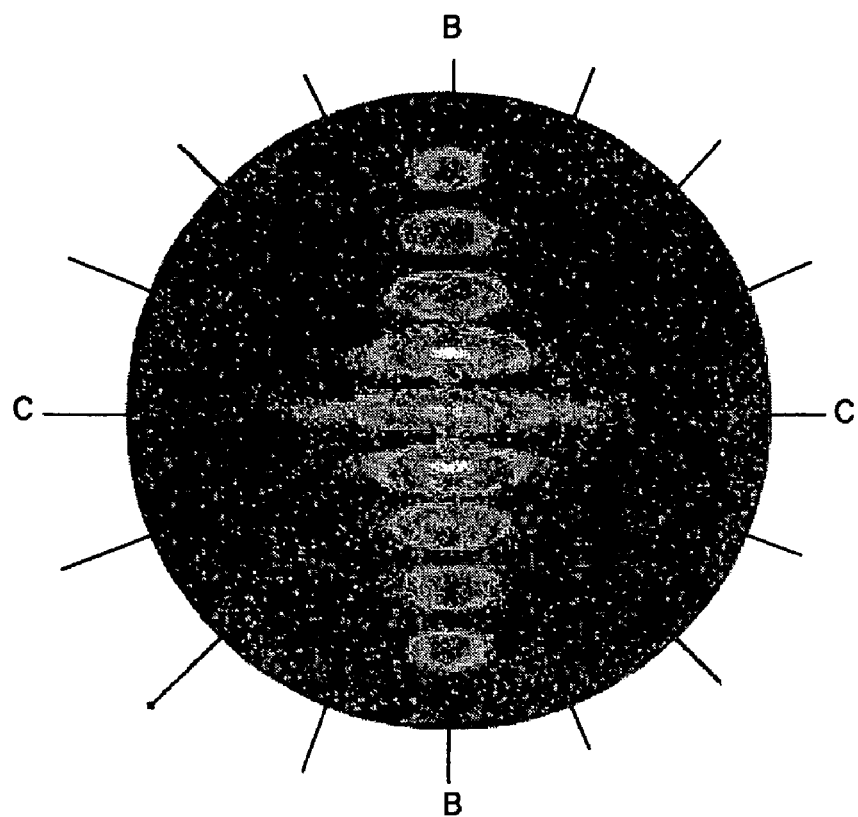
(B)
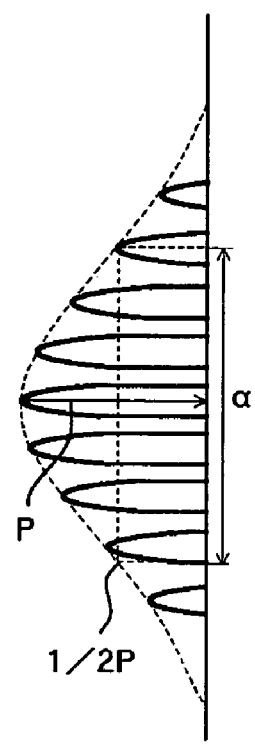
(C)
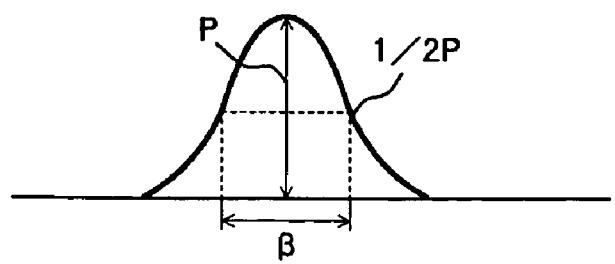

(PRIOR ART)

ILLUMINATION OPTICAL SYSTEM AND PROJECTION DISPLAY OPTICAL SYSTEM

BACKGROUND OF THE INVENTION

1. Field of the Invention

The present invention relates to an illumination optical system and a projection display optical system which are used in a projection display apparatus or the like.

2. Description of Related Art

Conventionally, in a projector type display (a projection display apparatus), a liquid crystal display panel or a micromirror array device panel is typically used as a light modulation element for switching to control transmission and shielding or deflection of light to project a selected light pattern onto a screen, thereby displaying an image on the screen.

In the projector which employs the liquid crystal display panel or the micromirror array device panel as the light modulation element, it is important to use light from a light source with high efficiency and reduce variations in illuminance on the screen.

An optical integrator formed of two lens arrays each including lenses arranged two-dimensionally is a known means for improvement. In the optical integrator, a first lens array splits a luminous flux from a light source into a plurality of luminous fluxes, and a second lens array and a condenser lens enlarge the luminous fluxes and form images by the luminous fluxes superimposed one on another on a display area of a light modulation element (see Japanese Patent Application Laid-Open No. 11(1999)-64848).

In this method, since the split luminous fluxes with small variations in illuminance are superimposed, the resulting irradiation light has high uniformity to significantly reduce variations in illuminance on the screen. When the first lens array has each aperture formed in a rectangular shape similar to the display area of the light modulation element, all the split luminous fluxes are irradiated to the display area without waste. This improves the efficiency of the irradiation light and thus improves the use efficiency of the light from the light source.

Another means for improvement is to guide light from a light source to a kaleidoscope to mix the vectors of light rays to provide uniform light intensity distribution at an end surface of the kaleidoscope from which the light emerges, and then form a conjugate image by an image-forming lens on a micromirror array device used as a light modulation element.

When the kaleidoscope is used, an optical system is complicated if a means for converting natural emission light from the light source into linearly polarized light is used. Thus, such a means is not used generally.

In the method, the resulting irradiation light has high uniformity to significantly reduce variations in illuminance on a screen.

However, in the method of providing uniform light intensity distribution using the optical integrator formed of two lens arrays or the kaleidoscope, the luminous flux illuminating the light modulation element has a large convergent angle. When the light modulation panel is realized by a reflection type liquid crystal display panel or a micromirror array device, limitations are imposed on space for forming an optical path along which the illumination light is guided. When a TIR (total internal reflection tilt) prism is used to guide light, the minimum angle of total reflection is limited. When a polarization beam splitter is used to guide light, limitations are imposed due to dependency of the reflectivity of S waves and transmittance of P waves on the incident angle. From these facts, the illumination luminous flux incident on the light modulation element is desirably close to a collimated luminous flux.

In addition, when a transmission type liquid crystal display panel is used as the light modulation element to modulate light of tree primary colors of red, green, and blue, the modulated light components are then combined by a dichroic mirror or dichroic prism. In this case, as the modulated light is less similar to a collimated luminous flux, the cut wavelength in a reflection/transmission wavelength region of a dichroic film is changed to produce turbidity of colors or variations in color reproducibility depending on the position of a projected image.

When twisted nematic liquid crystal (TNLC) is used as the light modulation element, whether it is of a transmission type or a reflection type, as the incident angle of an illumination luminous flux on the liquid crystal display panel is more inclined with respect to the normal to the panel, and generally, more inclined with respect to each side direction in the liquid crystal display panel plane, a larger deviation occurs from 0 or $\pi$ which is an ideal phase difference of a wave provided by transmission through the liquid crystal display panel. Therefore, contrast in light modulation is reduced.

To address this, the present inventors have proposed an illumination optical system which illuminates an illumination surface with a generally telecentric illumination luminous flux (which means that it includes somewhat divergent and convergent components) in which, in intensity distribution of illumination light on the illumination surface changing depending on a deviation angle of an incident ray with respect to a normal to the illumination surface, a ratio of angle widths at which light intensity reaches half of a peak value in each of two axis directions orthogonal to each other on the illumination surface is an aspect ratio of 2:1 or higher. The illumination optical system has an optical integrator which performs splitting and recombination on the luminous flux in a first axis direction on a section generally orthogonal to the traveling direction of the illumination luminous flux, and a light intensity conversion element which performs conversion of light intensity distribution in a second axis direction orthogonal to the first axis direction on the section.

This can realize an illumination optical system which can use light from a light source with high efficiency and can provide an illumination luminous flux with highly uniform illuminance. The illumination optical system can be used as an illumination section in a projection display optical system to provide a projected image with a high contrast.

In the illumination optical system described above, however, when an incident luminous flux from a light source lamp has large divergence, the use efficiency of light from the light source may be reduced.

In commercially available full-color projection type display apparatuses, a color splitting/recombination optical system typically has a color splitting direction set to a horizontal direction of a projected image. This is because an apparatus in an oblong shape is conveniently handled as a video-related device. For image signals, a displayed image has a length-to-width ratio of 4:3 as an image display ratio in the NTSC system, or a length-to-width ratio of 16:9 as an image ratio in the MUSE system. A long side direction of a light modulation panel naturally matches the direction of color splitting/recombination for full-color display.

In other words, the direction of luminous flux splitting in a wavelength band splitting film (a dichroic mirror or the like) or a polarization beam splitter corresponds to the long side direction of the light modulation panel.

To prevent degraded accuracy of light splitting due to variations in an incident angle of light on the wavelength band splitting film or the polarization beam splitter, it is necessary to set a small incident angle of an illumination luminous flux on the light demodulation panel in the direction of color splitting/recombination, that is, the long side direction of the light modulation panel.

Thus, in the illumination optical system proposed by the present inventors described above, the direction of optical integration is set to a short side direction of a light modulation panel.

In this case, a disadvantage occurs in the use efficiency of light from the light source lamp. Specifically, the direction of optical integration is set to the short side direction of the light modulation panel, so that the direction of multi-stage arrangement of a polarization conversion element called a PS conversion element which is mainly formed of polarization beam splitters arranged in multiple stages and half-wave plates is set to the short side direction of the light modulation panel. For this reason, the arrangement directions of the light source and a multi-stage slit mask disposed in the polarization conversion element, generally disposed in the long side direction of the light modulation panel, are also set to the short side direction of the light modulation panel. Consequently, a larger amount of light with divergence from the light source is shielded by the multi-stage slit mask to reduce light transfer efficiency of the illumination optical system.

SUMMARY OF THE INVENTION

It is an object of the present invention to provide an illumination optical system which provides an illumination luminous flux with a small incident angle on an illumination surface in one axis direction on a section of the illumination luminous flux and which suppresses a reduction in light amount blocked by a mask (that is, a reduction in light amount) provided for a polarization conversion element, a projection display optical system which employs the illumination optical system, a projection display apparatus, and an image display system.

To achieve the aforementioned object, according to one aspect, the present invention provides an illumination optical system which has a light source, an optical integrator, and a polarization conversion element including a polarization beam splitter array, a plurality of ½ wave plates, and a mask. The optical integrator uses a lens array to perform splitting (or splitting and recombination) of a luminous flux incident as a generally collimated luminous flux from the light source in a first axis direction in a two-dimensional section orthogonal to a traveling direction of the illumination luminous flux. The polarization beam splitter array has a plurality of polarization beam splitters arranged in multiple stages corresponding to a plurality of predetermined lens areas in the lens array. Each of the ½ wave plates rotates a polarization direction of first polarized light substantially 90 degrees out of the first and second polarized light with polarization directions orthogonal to each other split by each of the polarization beam splitters. The mask covers a plurality of areas of incident surfaces of the polarization beam splitter array to prevent incident of the second polarized light on each of the ½ wave plates.

The present invention according to another aspect provides a projection display apparatus which comprises a light source which is a discharge gas exciting arc tube of a DC drive type, an optical integrator which uses a lens array to perform splitting of a luminous flux incident as a generally collimated luminous flux from the light source in a first axis direction in a two-dimensional section orthogonal to a traveling direction of the luminous flux, and a polarization conversion element. The polarization conversion element includes a polarization beam splitter array, a plurality of ½ wave plates, and a mask. The polarization beam splitter array has a plurality of polarization beam splitters arranged in multiple stages corresponding to a plurality of predetermined lens areas in the lens array. Each of the ½ wave plates rotates a polarization direction of first polarized light substantially 90 degrees out of the first and second polarized light with polarization directions orthogonal to each other split by each of the polarization beam splitters. The mask covers a plurality of areas out of an incident surface of the polarization beam splitter array to prevent incidence of the second polarized light on each of the ½ wave plates. And the projection optical system further comprises a spatial light modulator which modulates a luminous flux emerging from the illumination optical system by a group of pixels arranged two-dimensionally, and a projection lens which projects the luminous flux modulated by the spatial light modulator onto a projection surface.

The present invention according to yet another aspect provides an illumination optical system which comprises a light source in which a cathode electrode and an anode electrode are provided, and by applying a DC voltage a discharge gas is excited and light is emitted from the vicinity of the cathode electrode, and a lens array in which a plurality of lenses are arranged in a first direction substantially orthogonal to an illumination direction. Each of the lenses condenses a part of a luminous flux from the light source in the first direction. The illumination optical system further comprises a mask in which light-transmitting portions transmits luminous fluxes condensed by the lenses and light-blocking portions blocking the luminous fluxes condensed by the lenses are arranged alternately in the first direction.

The present invention according to yet another aspect provides a projection display apparatus which comprises a light source in which a cathode electrode and an anode electrode are provided, and by applying a DC voltage a discharge gas is excited and light is emitted from the vicinity of the cathode electrode. The apparatus further comprises a lens array in which a plurality of lenses are arranged in a first direction substantially orthogonal to an illumination direction. Each lens condenses a part of a luminous flux from the light source in the first direction. The apparatus further comprises a mask in which light-transmitting portions transmits luminous fluxes condensed by the lenses and light-blocking portions blocking the luminous fluxes condensed by the lenses are arranged alternately in the first direction. The apparatus further comprises a polarization beam splitter array in which first polarization beam splitters and second polarization beam splitters are arranged alternately in the first direction. Each first polarization beam splitter reflects a first polarized light out of transmitted light through the light-transmitting portion and transmits a second polarized light out of the transmitted light. The polarization direction of the second polarized light is rotated by substantially 90 degrees from the polarization direction of the first polarized light. Each second polarization beam splitter reflects the first polarized light reflected by the first polarization beam splitter in a direction substantially parallel to the transmitting direction of the second polarized light. The apparatus further comprises wave plates which rotate the polarization direction of the first polarized light from the second polarization beam splitters substantially 90 degrees, and a light modulator which modulates the second polarized light at a substantial rectangular area having a short side in the first direction. The projection display apparatus further comprises a projection optical system which projects modulated light by the light modulator.

These and other characteristics of the illumination optical system, the projection display optical system employing the illumination optical system, the projection display apparatus, and the image display system of the present invention will be apparent from the following description of specific embodiments with reference to the drawings.

BRIEF DESCRIPTION OF THE DRAWINGS

FIGS. 7(A) to 7(C) are diagrams for explaining the process of producing generally uniform light intensity distribution by the illumination optical system;

FIGS. 8(A) and 8(B) are graphs for explaining the process of producing generally uniform light intensity distribution by the illumination optical system;

FIGS. 9(A) to 9(C) show light irradiation angle distribution on a light modulation panel by the illumination optical system;

DETAILED DESCRIPTION OF THE PREFERRED EMBODIMENTS

In the following, embodiments of the present invention are described with reference to the drawings.

(Embodiment 1)

Figure 1:
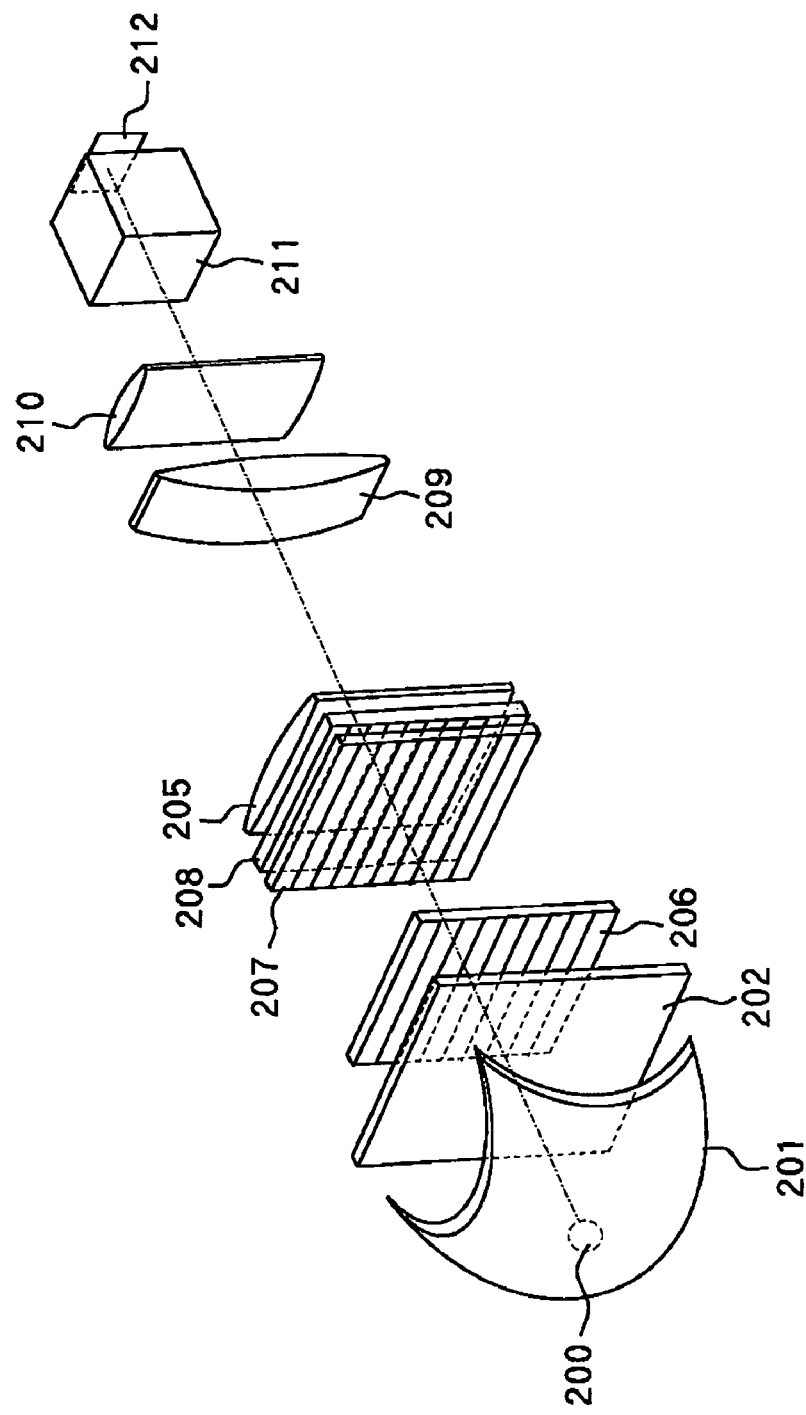
FIG. 1 schematically shows the structure of an illumination optical system which is Embodiment 1 of the present invention.

FIG. 1 shows the structure of an illumination optical system which is Embodiment 1 of the present invention. In FIG. 1, reference numeral 200 shows a gas exciting lamp of a DC drive type (a discharge gas exciting arc tube of a DC drive type) serving as a light source. As the lamp 200, a high-pressure mercury lamp, a metal halide lamp, a xenon lamp or the like is used. The light source lamp 200 is used in combination with a parabolic reflecting mirror 201 to produce a generally collimated visible light beam.

To provide a high-quality collimated luminous flux with the smallest possible divergence (the smallest possible divergence angle), the light source lamp 200 has a minimized discharge gap designed to limit an electron excited area in a gas. A DC bias is applied between a cathode and anode electrodes to produce a point source with high luminance on the side (in the vicinity) of the cathode electrode.

Of the luminous flux emitted from a lamp unit formed of the light source lamp 200 and the parabolic reflecting mirror 201, ultraviolet rays outside visible light are cut by an ultraviolet ray cut filter 202.

Optical glass and an optical thin film used as materials of a lens are excited by the ultraviolet rays and deterioration of them occurs in the long term. However, the ultraviolet ray cut filter 202 is provided mainly for preventing the ultraviolet rays from decomposing and altering a liquid crystal polymer which is an organic material or a polymer liquid crystal orientation film for arranging liquid crystal molecules when a liquid crystal element is used for a light modulation panel (a spatial light modulator).

The luminous flux of visible light transmitted through the ultraviolet ray cut filter 202 is then incident on a first cylindrical lens array homogenizer 206. The first cylindrical lens array homogenizer 206 has a refractive power only in a vertical direction (first axis direction) in FIG. 1. The first cylindrical lens array homogenizer 206 splits the incident luminous flux into luminous fluxes, the number of which is equal to the number of the lenses of the array, and focal lines are individually formed, and then a cylindrical condenser lens 209 converts the luminous fluxes into collimated luminous fluxes set to have a predetermined width.

The spacing between the principal planes of the first cylindrical lens array homogenizer 206 and the cylindrical condenser lens 209 is set to the sum of the focal length of the first cylindrical lens array homogenizer 206 and the focal length of the cylindrical condenser lens 209. This causes the luminous fluxes to be converted into collimated luminous fluxes as described above.

Since the first cylindrical lens array homogenizer 206 has an optical axis line decentered with respect to an optical axis line of each lens of the array, the cylindrical condenser lens 209 superimposes the luminous fluxes transmitted through the respective lenses of the first cylindrical lens array homogenizer 206 at the position of a focal line of the cylindrical condenser lens 209. This achieves an optical integration operation. The position of the focal line of the cylindrical condenser lens 209 corresponds to a modulation surface of a light modulation panel 212.

The luminous fluxes transmitted through the first cylindrical lens array homogenizer 206 are transmitted through a second cylindrical lens array homogenizer 207. The positions of focal lines of the second cylindrical lens array homogenizer 207 are set to the positions of pupils of the respective lenses of the first cylindrical lens array homogenizer 206. The tandem lens structure of the second cylindrical lens array homogenizer 207 and the cylindrical condenser lens 209 results in an optically conjugate relationship between the pupils of the respective lenses of the first cylindrical lens array homogenizer 206 and the modulation surface of the light modulation panel 212. Consequently, the pupils of the respective lenses of the first cylindrical lens array homogenizer 206 are imaged on the modulation surface of the light modulation panel 212 in the vertical direction in FIG. 1.

The luminous flux emitted from the lamp unit formed of the light source lamp 200 and the parabolic reflecting mirror 201 is not completely collimated and has divergence. The second cylindrical lens array homogenizer 207 corrects the divergence of the luminous flux to reliably guide the luminous flux transmitted through the pupil of each lens of the first cylindrical lens array homogenizer 206 to the modulation surface of the light modulation panel 212.

The luminous fluxes transmitted through the second cylindrical lens array homogenizer 207 are incident on a polarization conversion element 208. The polarization conversion element 208 is similar to that called a PS conversion element which is generally used in a liquid crystal projector. The polarization conversion element 208 changes the light emitted from the lamp unit into polarized light components in parallel with one direction, for example with the vertical direction in FIG. 1, by an array of polarization beam splitters.

(About Polarization Conversion Element 208)

Figure 2:
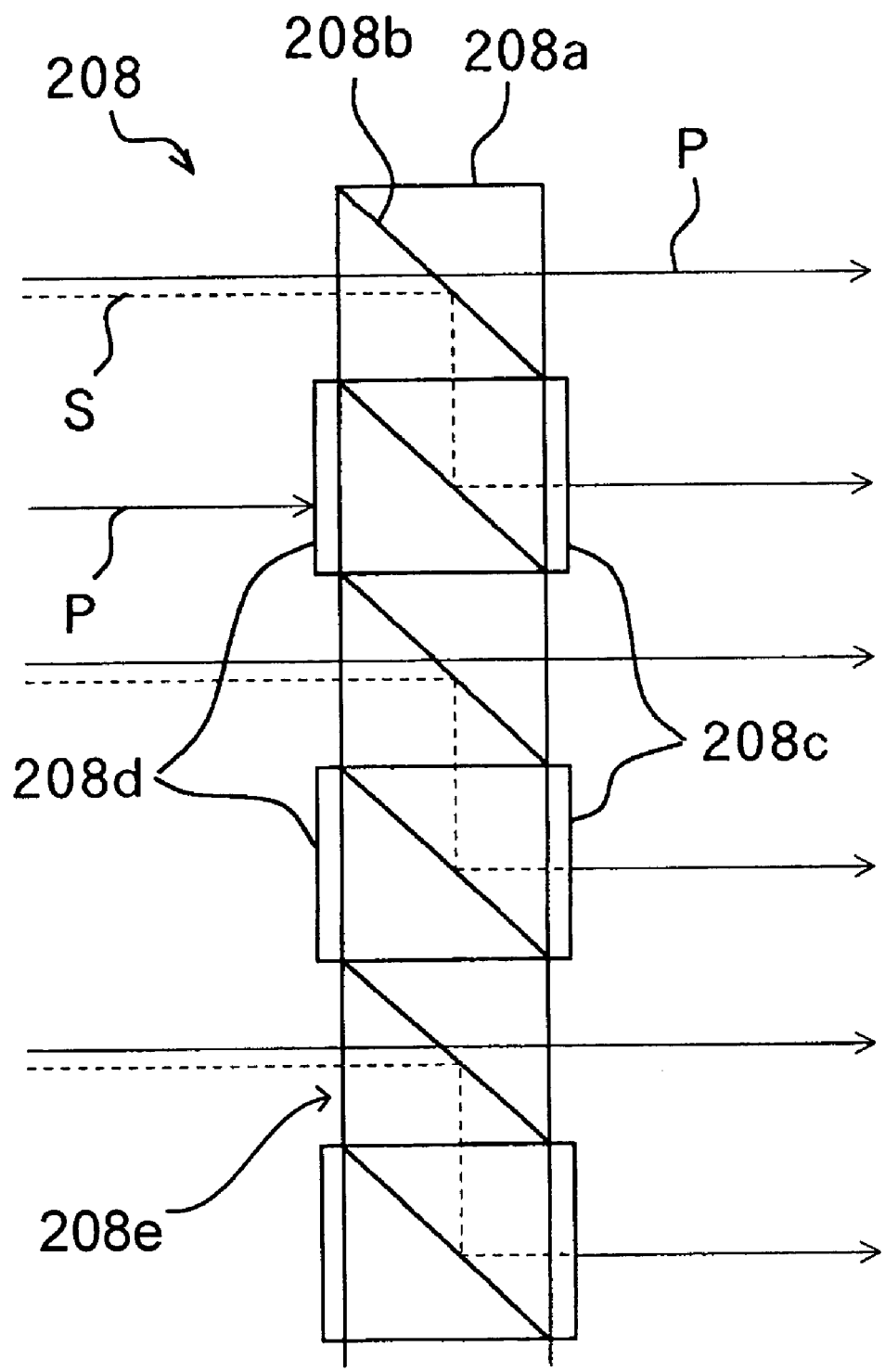
FIG. 2 schematically shows the structure of a polarization conversion element included in the illumination optical system in FIG. 1.

FIG. 2 schematically shows the polarization conversion element 208. The polarization conversion element 208 is formed of a polarization beam splitter array 208a, a plurality of half-wave plates (½ wave plates) 208c, and a multi-stage slit mask (hereinafter referred to simply as a "mask") 208d. The polarization beam splitter array 208a includes a number of (a plurality of) stages of polarization beam splitters disposed in the vertical direction, in which each polarization beam splitter has a polarization splitting film 208b inclined 45 degrees with respect to an incident optical axis. The ½ wave plate 208c is provided on an emergent surface of every other polarization beam splitter (second polarization beam splitter) in the vertical direction of the plurality of polarization beam splitters. The mask (light-blocking portions) 208d covers each incident surface of the polarization beam splitter provided with the ½ wave plate 208c and has slit-like apertures (light-transmitting portions) 208e which match incident surfaces of the polarization beam splitters (first polarization beam splitters) provided with no half-wave plate 208c.

A P-polarized light component with a polarization direction in parallel with the sheet of FIG. 2 is transmitted through the polarization splitting film 208b. An S-polarized light component with a polarization direction orthogonal to the sheet of FIG. 2 is reflected by the polarization splitting film 208b and again reflected by the polarization splitting film 208b of the polarization beam splitter immediately below. This causes the optical path of the S-polarized light component to be shifted downward by a pitch of the polarization beam splitters arranged in the polarization beam splitter array 208a.

The S-polarized light component emerging from the polarization beam splitter is given a phase difference of π by the ½ wave plate 208c and thus the polarization direction thereof is changed substantially 90 degrees. The resulting light emerges from the polarization conversion element 208 as P-polarized light. In this manner, all luminous fluxes transmitted through the polarization conversion element 208 become linearly polarized light which is P-polarized light with respect to the polarization beam splitters. In other words, all the luminous fluxes emerge as polarized waves in parallel with the sheet.

If the P-polarized light transmitted through the polarization splitting film 208b is incident on the ½ wave plate 208c, the polarization direction thereof is rotated substantially 90 degrees to result in S-polarized light which emerges from the polarization conversion element 208. To avoid this, the mask 208d for preventing incidence of luminous fluxes is provided on the incident surfaces of the polarization beam splitters opposite to the ½ wave plates 208c to allow incidence of luminous fluxes only in the slit apertures 208e formed in the mask 208d.

In FIG. 1, the luminous fluxes transmitted through the polarization conversion element 208 are incident on a first cylindrical lens 205. The first cylindrical lens 205 has a refractive power only in a horizontal direction in FIG. 1, and forms a beam compressor as a pair with a second cylindrical lens 210 disposed in a direction in which the luminous fluxes travel. Thus, the luminous fluxes incident on the first cylindrical lens 205 are compressed in the horizontal direction in FIG. 1, and are basically guided to the light modulation panel 212 in an afocal state.

In the present embodiment, however, the beam compressor is intentionally provided with a predetermined amount of pupil distortion aberration which controls light intensity on the modulation surface of the light modulation panel 212 as an illumination surface to have uniform or arbitrary distribution. The effects of the pupil distortion aberration of the beam compressor are later described with reference to FIG. 5.

The luminous fluxes transmitted through the first cylindrical lens 205 are incident on the cylindrical condenser lens 209. As described above, the cylindrical condenser lens 209 superimposes the luminous fluxes in the vertical direction in FIG. 1 for integration on the modulation surface of the light modulation panel 212 located at the position of the focal line of the cylindrical condenser lens 209.

The luminous fluxes transmitted through the cylindrical condenser lens 209 are incident on the second cylindrical lens 210. The second cylindrical lens 210 has a refractive power only in the horizontal direction in FIG. 1 and forms the beam compressor as a pair with the first cylindrical lens 205 as described above. Thus, the luminous fluxes are compressed in the horizontal direction in FIG. 1 and guided to the light modulation panel 212 in an afocal state.

The second cylindrical lens 210 is arranged to dispose a pupil of the first cylindrical lens 205 and the modulation surface of the light modulation panel 212 generally in an optically conjugate relationship (the optically conjugate relationship has low accuracy due to the aberration intentionally provided for the beam compressor). The pupil of the first cylindrical lens 205 is thus imaged on the modulation surface of the light modulation panel 212 in the horizontal direction in FIG. 1.

The second cylindrical lens 210 is arranged for correcting the divergence of the luminous fluxes emitted from the lamp unit formed of the light source lamp 200 and the parabolic reflecting mirror 201 to reliably guide the luminous fluxes transmitted through the pupil of the first cylindrical lens 205 to the modulation surface of the light modulation panel 212, similarly to the function of the second cylindrical lens array homogenizer 207.

The luminous fluxes transmitted through the cylindrical lens 210 are incident on a dummy polarization beam splitter 211. The dummy may be formed of a dichroic prism or mirror instead. Whether the dummy is formed of a polarization beam splitter or a dichroic prism, the polarization direction of the luminous fluxes is set to the vertical direction in FIG. 1.

As described above, the luminous fluxes transmitted through the illumination optical system of the present embodiment are guided to the light modulation panel 212. The illumination characteristics of the present embodiment are later described.

(About Light Source Lamp (DC Drive Type Discharge Gas Exciting Arc Tube) 200)

Figure 3:
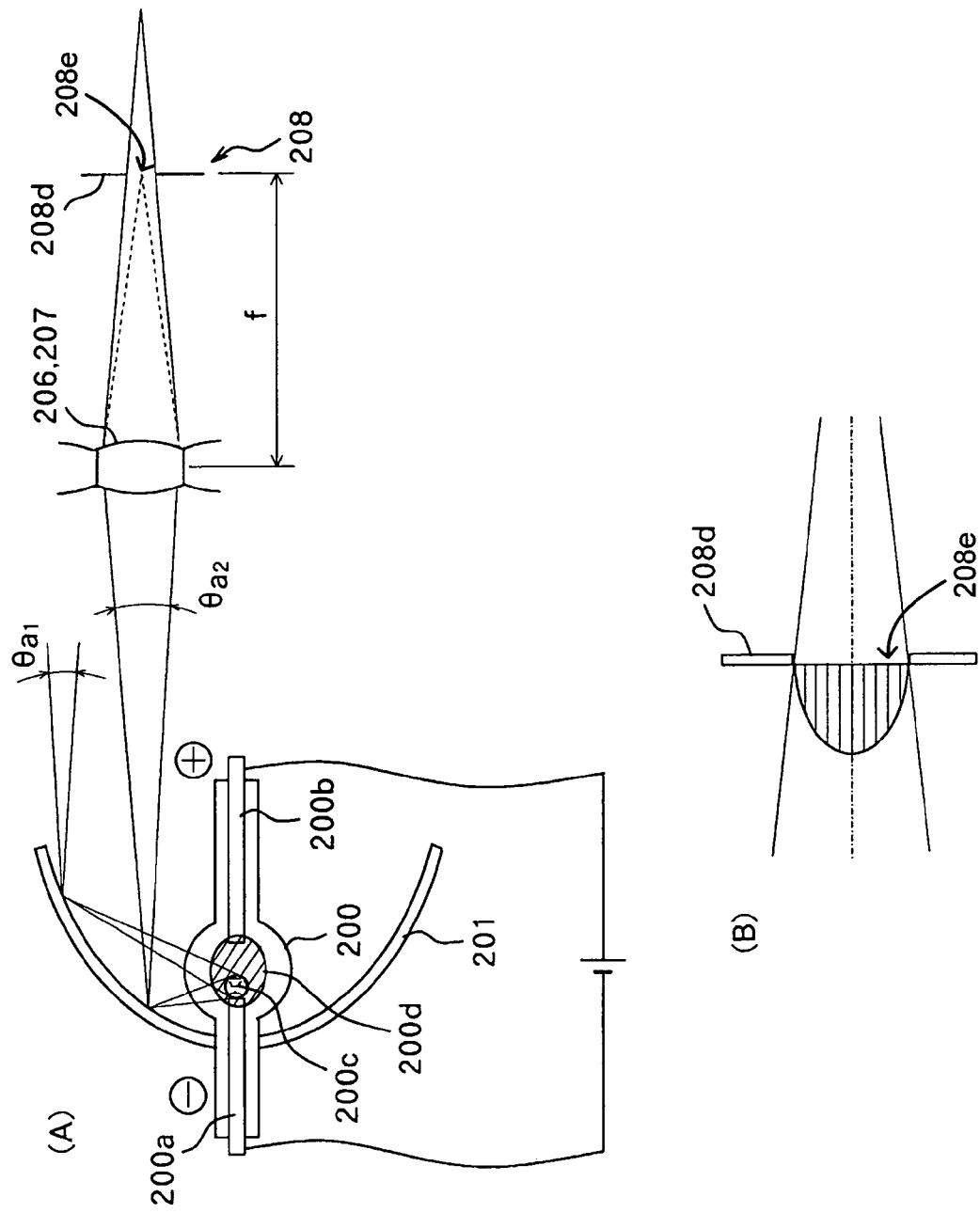
FIGS. 3(A) and 3(B) are schematic diagrams showing a luminous flux from a discharge gas exciting arc tube of a DC drive type in the illumination optical system in FIG. 1 toward the polarization conversion element.

Next, description is made for a luminous flux emitted from the lamp unit and incident on the polarization conversion element 208 with reference to FIGS. 3(A) and 3(B).

FIG. 3(A) shows, in a simplified form, the lamp unit formed of the light source lamp 200 and the parabolic reflecting mirror 201, the mask 208d provided for the polarization conversion element 208, and the first cylindrical lens array homogenizer 206 which is disposed between the lamp unit and the mask 208d. The ultraviolet ray cut filter 202 and the second cylindrical lens array homogenizer 207 are omitted in FIG. 3(A).

The light source lamp 200 is formed such that a discharge end of a cathode electrode 200a is disposed at the focal point of the parabolic reflecting mirror 201 and an absorption end of an anode electrode 200b is disposed ahead away from the discharge end of the cathode electrode 200a by a predetermined discharge gap.

When a DC bias is applied to the light source lamp 200, electrons emitted from the side of the cathode electrode 200a excite the gas to produce a light emission area 200c with high luminance near the discharge end of the cathode electrode 200a. A light emission area 200d with low luminance is also formed between both electrodes 200a and 200b.

Light emitted from the light emission area 200c obliquely backward is reflected by a portion of the parabolic reflecting mirror 201 near the light source lamp 200 and directed toward the first cylindrical lens array homogenizer 206 while it is diverged at a divergence angle $\theta_{a2}$. Then, the luminous flux emerging from the first cylindrical lens array homogenizer 206 is incident on the polarization conversion element 208 from the slit aperture 208e between the mask 208d while it is converged.

On the other hand, light emitted from the light emission area 200c obliquely forward is reflected by a portion of the parabolic reflecting mirror 201 away from the light source lamp 200 and directed toward the polarization conversion element 208 via the first cylindrical lens array homogenizer 206 while it is diverged at a divergent angle $\theta_{a1}$.

The slit aperture 208e in the mask 208d of the polarization conversion element 208 is disposed at the position away from the first cylindrical lens array homogenizer 206 by the focal length f thereof.

Figure 4:
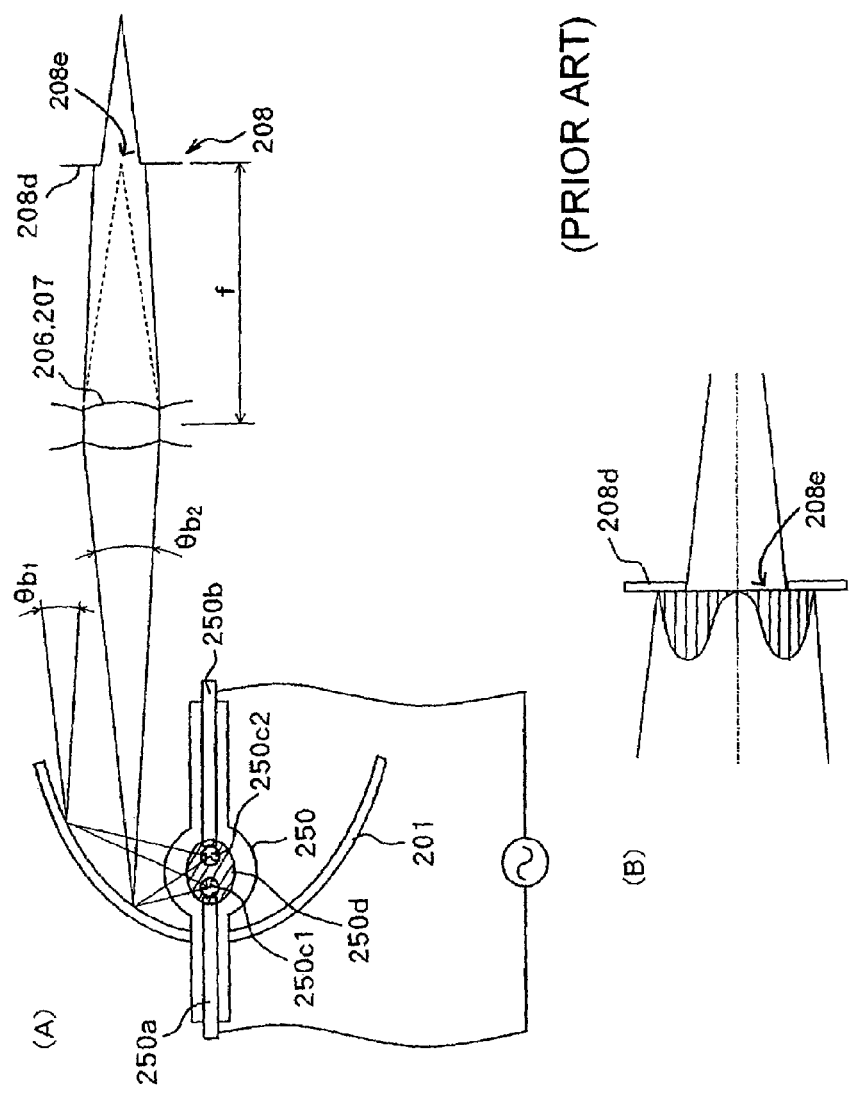
FIGS. 4(A) and 4(B) are schematic diagrams showing a luminous flux from a discharge gas exciting arc tube of an AC drive type in the illumination optical system toward the polarization conversion element.

FIG. 4(A) shows a luminous flux incident on the polarization conversion element 208 when a light source lamp 250 of an AC drive type is used in the illumination optical system shown in FIG. 3(A).

The light source lamp 250 is formed such that the focal point of the parabolic reflecting mirror 201 is positioned between a discharge end of an electrode 250a and a discharge end of an electrode 250b. When an AD bias is applied to the light source lamp 250, a gas is excited between both electrodes 250a and 250b to produce two light emission areas 250c1 and 250c2 with high luminance near the discharge end of the electrode 250a and the discharge end of the electrode 250b. A light emission area 250d with low luminance is also formed between both electrodes 250a and 250b.

Light emitted from the two light emission areas 250c1 and 250c2 obliquely backward is reflected by a portion of the parabolic reflecting mirror 201 near the light source lamp 250 and directed toward the first cylindrical lens array homogenizer 206 while it is diverged at a divergence angle $\theta_{b2}$. Then, the luminous flux emitted from the first cylindrical lens array homogenizer 206 is incident on the polarization conversion element 208 from the slit aperture 208e in the mask 208d while it is converged.

In FIG. 4(A), the slit aperture 208e in the mask 208d of the polarization conversion element 208 is disposed at the position away from the first cylindrical lens array homogenizer 206 by the focal length f thereof, similarly to FIG. 3(A).

On the other hand, light emitted from the two light emission area 250c1 and 250c2 obliquely forward is reflected by a portion of the parabolic reflecting mirror 201 away from the light source lamp 250 and directed toward the polarization conversion element 208 via the first cylindrical lens array homogenizer 206 while it is diverged at a divergent angle $\theta_{b1}$.

In FIG. 3(A) and FIG. 4(A), the following relationships are satisfied:

$$\theta_{a1} < \theta_{b1}$$

$$\theta_{a2} < \theta_{b2}$$

FIG. 4(B) shows the luminous flux toward the slit aperture 208e in the mask 208d when the light source lamp 250 which is the AD drive type gas exciting lamp is used. Since the light source lamp 250 forms the two light emission portions with high luminance, the luminous flux has intensity distribution which includes the peak intensity near the periphery of the slit aperture 208e. However, the divergent angles $\theta_{b1}$ and $\theta_{b2}$ of the luminous flux are relatively large, so that a large portion of the luminous flux toward the slit aperture 208e is blocked by the mask 208d. Thus, a large reduction in light amount occurs due to the mask 208d provided in the illumination optical system.

On the other hand, FIG. 3(B) show the luminous flux toward the slit aperture 208e in the mask 208d in the present embodiment employing the light source lamp 200 which is the discharge gas exciting arc tube of the DC drive type. Since the light source lamp 200 forms the single light emission portion with high luminance, so that the luminous flux has intensity distribution which includes the peak intensity generally at the center of the slit aperture 208e and a lower intensity toward an edge thereof. In other words, variations of light intensity distribution of the luminous flux are reduced as compared with the case shown in FIG. 4(B).

In addition, since the divergent angles $\theta_{a1}$ and $\theta_{a2}$ of the luminous flux are smaller than the divergent angles $\theta_{b1}$ and $\theta_{b2}$ in the case shown in FIG. 4(A) when the light source lamp 250 of the AC drive type is used, respectively, a smaller portion of the luminous flux toward the slit aperture 208e is blocked by the mask 208d.

The smaller portion of the luminous flux is essentially blocked by the mask 208d as described above, and in addition, that blocked portion of the luminous flux has low light intensity. These facts make it possible to significantly suppress a reduction in light amount due to the mask 208d as compared with the case where the discharge gas exciting arc tube of the AC drive type is used.

In this manner, the use of the discharge gas exciting arc tube of the DC drive type can suppress a reduction in light amount when the luminous flux is incident on the polarization conversion element 208 as compared with the case where the discharge gas exciting arc tube of the AC drive type is used, thereby allowing improvement in light transfer efficiency of the illumination optical system which employs the polarization conversion element 208. In other words, the light from the light source lamp 200 can be utilized with high efficiency.

(About Optical Integrator)

Next, description is made for an optical integrator used in the illumination optical system described above with reference to FIG. 5.

Figure 5:
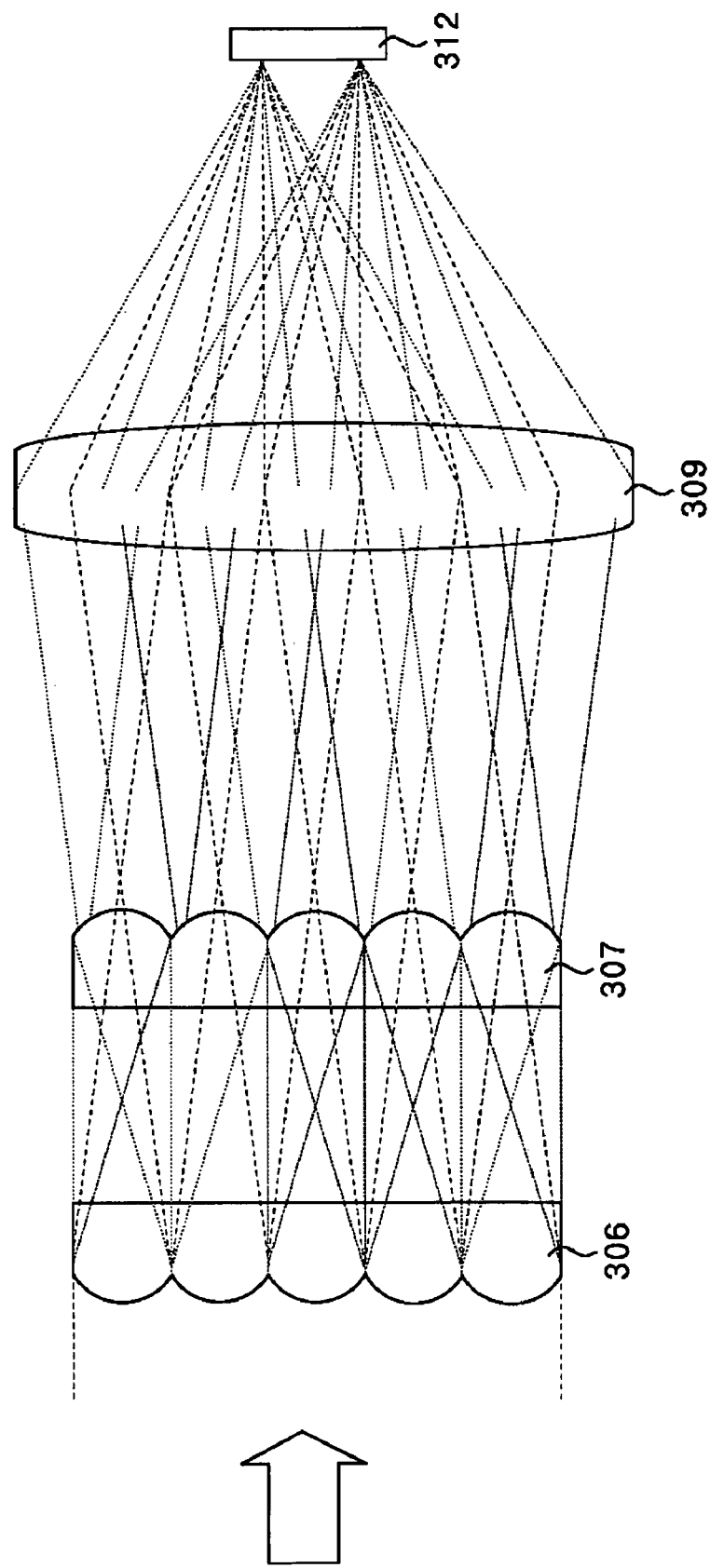
FIG. 5 is a schematic diagram for explaining the function of an optical integrator incorporated in the illumination optical system.

In optics disposed in FIG. 5, a first cylindrical lens array homogenizer 306 corresponds to the first cylindrical lens array homogenizer 206 in FIG. 1. A second cylindrical lens array homogenizer 307 corresponds to the second cylindrical lens array homogenizer 207 in FIG. 1.

A cylindrical condenser lens 309 corresponds to the cylindrical condenser lens 209 in FIG. 1.

The first and second cylindrical lens array homogenizers 306 and 307, and the cylindrical condenser lens 309 constitute the optical integrator.

A light modulation panel 312 in FIG. 5 corresponds to the light modulation panel 212 in FIG. 1.

A luminous flux indicated by an outline arrow in FIG. 5, which is guided to the first cylindrical lens array homogenizer 306 and generally collimated in an optical integration direction, is split by pupils of lenses in the array in the vertical direction (first axis direction) in FIG. 5 and condensed on respective focal lines. The positions of the focal lines of the first cylindrical lens array homogenizer 306 are close to the positions of pupils of the second cylindrical lens array homogenizer 307, and are arranged such that the incident luminous flux indicated by the outline arrow is hardly subjected to a refractive effect by the second cylindrical lens array homogenizer 307 when the luminous flux is completely collimated ideal light.

Each luminous flux transmitted through the second cylindrical lens array homogenizer 307 is guided to the cylindrical condenser lens 309. Since the optical axis of each luminous flux is shifted from the optical axis of the cylindrical condenser lens 309, the optical axes of the respective luminous fluxes split by the pupils of the lenses of the first cylindrical lens array homogenizer 306 are condensed at the position of a focal line of the cylindrical condenser lens 309.

The distance between the principal planes of the first cylindrical lens array homogenizer 306 and the cylindrical condenser lens 309 is set to the sum of the focal length of the first cylindrical lens array homogenizer 306 and the focal length of the cylindrical condenser lens 309. Thus, each luminous flux split by the pupil of each lens of the first cylindrical lens array homogenizer 306 is transmitted through the cylindrical condenser lens 309 to become collimated light in cross section of FIG. 5.

The width of the collimated light is set to be enlarged at a ratio of the focal length of the first cylindrical lens array homogenizer 306 to the focal length of the cylindrical condenser lens 309.

On the other hand, a modulation surface of the light modulation panel 312 is disposed at the position of the focal line of the cylindrical condenser lens 309. This achieves an optical integration operation on the modulation surface of the light modulation panel 312. Consequently, the luminous flux incident on the illumination optical system is converted to light having generally uniform light intensity distribution which is irradiated to the modulation surface of the light modulation panel 312, irrespective of light intensity distribution at the time of the incidence to the illumination optical system.

Next, description is made for the function of the second cylindrical lens array homogenizer 307. The incident luminous flux indicated by the outline arrow in FIG. 5 is not completely collimated. Especially, in the present embodiment which employs the light source lamp 200 with gas exciting light emission rather than a laser, the area for excitation and light emission has a finite area on the order of 0.1 mm at the minimum. Thus, even the use of a collimating lens or a parabolic reflecting mirror cannot provide a completely collimated beam, and the aforementioned incident luminous flux always includes divergence (a divergence angle).

The second cylindrical lens array homogenizer 307 is provided for correcting a blurred outline of an illumination area on the light modulation panel 312 due to the divergence error.

Description is hereinafter made with reference to FIG. 5. The luminous fluxes split by the pupils of the lenses of the first cylindrical lens array homogenizer 306 have divergence components from the entire pupil area. Thus, the pupil images of the lenses of the first cylindrical lens array homogenizer 306 are projected and formed onto the modulation surface of the light modulation panel 312 by the recombination system formed of the second cylindrical lens array homogenizer 307 and the cylindrical condenser lens 309.

The position of a focal line on the side of light incidence of each lens of the second cylindrical lens array homogenizer 307 is set to the pupil position of each lens of the first cylindrical lens array homogenizer 306. The divergence components of the luminous fluxes split by the pupils of the lenses of the first cylindrical lens array homogenizer 306 are shown by fine dotted lines in FIG. 5. The luminous fluxes split by the pupils of the lenses of the first cylindrical lens array homogenizer 306 are transmitted through the second cylindrical lens array homogenizer 307 and thus converted into collimated light in cross section of FIG. 5. The collimated light is condensed to the focal line plane of the cylindrical condenser lens 309 by the cylindrical condenser lens 309.

In other words, the pupil images of the lenses of the first cylindrical lens array homogenizer 306 are superimposed and formed into images in an optically integrated state on the modulation surface of the light modulation panel 312. Thus, the modulation surface of the light modulation panel 312 is illuminated by light which has intensity distribution with sharp edges in cross section of FIG. 5.

(About Optics For Converting Light Intensity Distribution)

Figure 6:
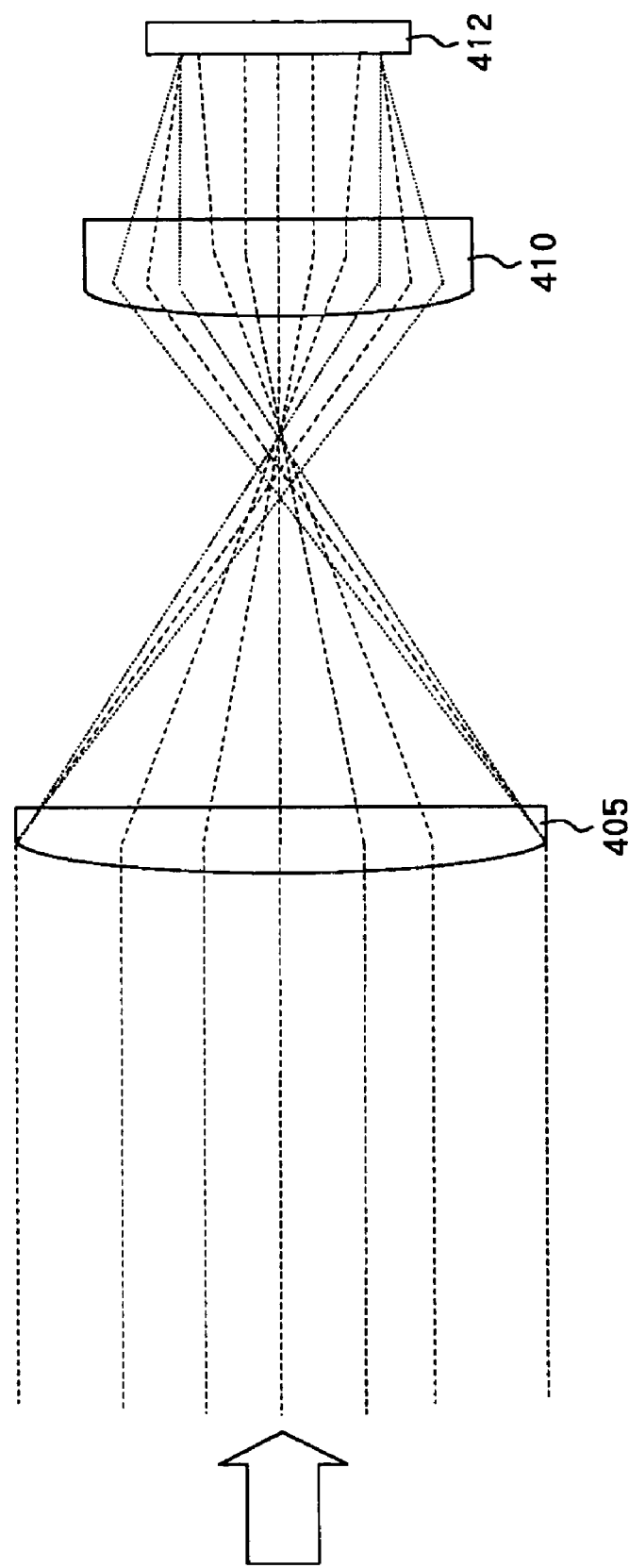
FIG. 6 is a schematic diagram for explaining the function of light intensity conversion optics incorporated in the illumination optical system.

Next, description is made for the optics which convert light intensity distribution incorporated in the illumination optical system of the aforementioned embodiment with reference to FIG. 6.

In the optics in FIG. 6, a first cylindrical lens 405 corresponds to the first cylindrical lens 205 in FIG. 1, and a second cylindrical lens 410 corresponds to the second cylindrical lens 210 in FIG. 1. A light modulation panel 412 corresponds to the light modulation panel 212 in FIG. 1.

A generally collimated luminous flux indicated by an outline arrow in FIG. 6 is incident on the first cylindrical lens 405. The first cylindrical lens 405 and the second cylindrical lens 410 disposed next constitute an afocal beam compressor of a convex-convex pair. The magnification of beam compression is set such that the width of the incident luminous flux substantially matches the effective width of the light modulation panel 412.

The spacing between the principal planes of the first cylindrical lens 405 and the second cylindrical lens 410 is set to the sum of the focal length of the first cylindrical lens 405 and the focal length of the second cylindrical lens 410. Thus, in cross section of the sheet of FIG. 6, the luminous flux incident as the generally collimated light emerges as generally collimated light with an angular magnification corresponding to the reciprocal of the compression magnification and irradiated to the light modulation panel 412.

On the other hand, the second cylindrical lens 410 has another function. The incident luminous flux indicated by the outline arrow in FIG. 6 is not completely collimated. Especially, in the present embodiment which employs the light source lamp 200 with gas exciting light emission source rather than a laser, the area for excitation and light emission has a finite area on the order of 0.1 mm at the minimum. Thus, even the use of a collimating lens or a parabolic reflecting mirror cannot provide a completely collimated beam, and the incident luminous flux always includes divergence (a divergence angle).

The second cylindrical lens 410 has the function of correcting a blurred outline of an illumination area on the light modulation panel 412 due to the divergence error.

The first cylindrical lens 405 transmits the luminous flux with divergence components from the entire pupil area thereof. The pupil image of the first cylindrical lens 405 is projected and imaged onto a modulation surface of the light modulation panel 412 by the second cylindrical lens 410.

The position of an image-forming conjugate line on the side of light incidence of the second cylindrical lens 410 is set to the pupil position of the first cylindrical lens 405. The position of an image-forming conjugate line on the side of light emergence of the second cylindrical lens 410 is set to the modulation surface of the light modulation panel 412. The divergence component of the luminous flux from the pupil of the first cylindrical lens 405 is shown by fine dotted lines in FIG. 6. Each luminous flux split by the pupil of the first cylindrical lens 405 is transmitted through the second cylindrical lens 410 and thus condensed on the modulation surface of the light modulation panel 412 in cross section of FIG. 6. In other words, the pupil image of the second cylindrical lens 410 is transferred and formed into an image on the modulation surface of the light modulation panel 412.

The beam compressor formed of the first cylindrical lens 405 and the second cylindrical lens 410 is an afocal optical system. Pupil distortion aberration, also referred to as spherical aberration in an afocal system, is intentionally provided as aberration caused by the pupil image transfer by the beam compressor. Each cylindrical surface of the first cylindrical lens 405 and the second cylindrical lens 410 has a small curvature and is designed to produce more aberration with a shift amount from the optical axis. As shown by coarse dotted lines in FIG. 6, rays close to the optical axis are transmitted through the second cylindrical lens 410 and then converted to a slightly divergent luminous flux in cross section of the sheet of FIG. 6.

On the other hand, rays on the periphery of the pupil away from the optical axis are transmitted through the second cylindrical lens 410 and then converted to a slightly convergent luminous flux in cross section of the sheet of FIG. 6. Since the changes of divergence and convergence are continuously and smoothly provided in this manner, the ray density is low at the central portion and high at the peripheral portion on the modulation surface of the light modulation panel 412 in cross section of the sheet of FIG. 6. Light intensity distribution illuminating the modulation surface of the light modulation panel 412 is provided by multiplying light intensity distribution of the incident luminous flux indicated with the outline arrow from the lamp unit formed of the gas exciting light source and the parabolic reflecting mirror by the aforementioned ray density distribution.

Description is here made for light intensity distribution with which the light modulation panel is illuminated by using a combination of the light intensity conversion optics and the optical integrator described in FIG. 5, with reference to FIGS. 7(A) to 7(C) and 8(A) and 8(B).

FIGS. 7(A) to 7(C) and 8(A) and 8(B) show the process of forming light intensity distribution on the light modulation panel by the illumination optical system of the present embodiment. FIGS. 7(A) and 8(A) show a cross sectional profile of the luminous flux emitted from the lamp unit formed of the light source lamp 200 and the parabolic reflecting mirror 201. In FIG. 7(A), a brighter portion indicates a higher light intensity. In FIG. 8(A), a solid line shows light intensity distribution in cross section in a horizontal (X) direction at the center (0 mm) in a vertical (Y) direction (that is, a short side direction of the rectangular light modulation panel corresponding to a first axis direction) in FIG. 7(A), while a dotted line shows light intensity distribution in cross section in the vertical (Y) direction at the center (0 mm) in the horizontal (X) direction (that is, a long side direction of the rectangular light modulation panel corresponding to a second axis direction) in FIG. 7(A).

The light intensity distribution of the luminous flux shown in FIGS. 7(A) and 8(A) is divided and integrated by the optical integrator in areas sectioned by horizontal lines in FIG. 7(A). Then, the light intensity distribution is multiplied in the direction of the light intensity conversion optics by ray density distribution on the modulation surface of the light modulation panel (light modulation panel surface) shown in FIG. 7(B) resulting from the aforementioned pupil distortion aberration of the beam compressor to provide light intensity distribution on the modulation surface of the light modulation panel shown in FIGS. 7(C) and 8(B).

As can be seen from FIGS. 7(C) and 8(B), the light intensity distribution of the illumination luminous flux incident on the modulation surface of the light modulation panel has high intensity and is generally flat (uniform).

It goes without saying, however, that the ray density distribution on the modulation surface of the light modulation panel can be changed in accordance with a purpose by designing the pupil distortion aberration of the beam compressor to a predetermined value. In this manner, the illumination luminous flux incident on the modulation surface of the light modulation panel can be intentionally provided with predetermined light intensity distribution in the direction in which the light intensity conversion optics exert the effect.

Next, characteristics provided by the illumination optical system explained so far are described with reference to FIGS. 9(A) to 9(C) and 10(A) to 10(C).

Figure 10:
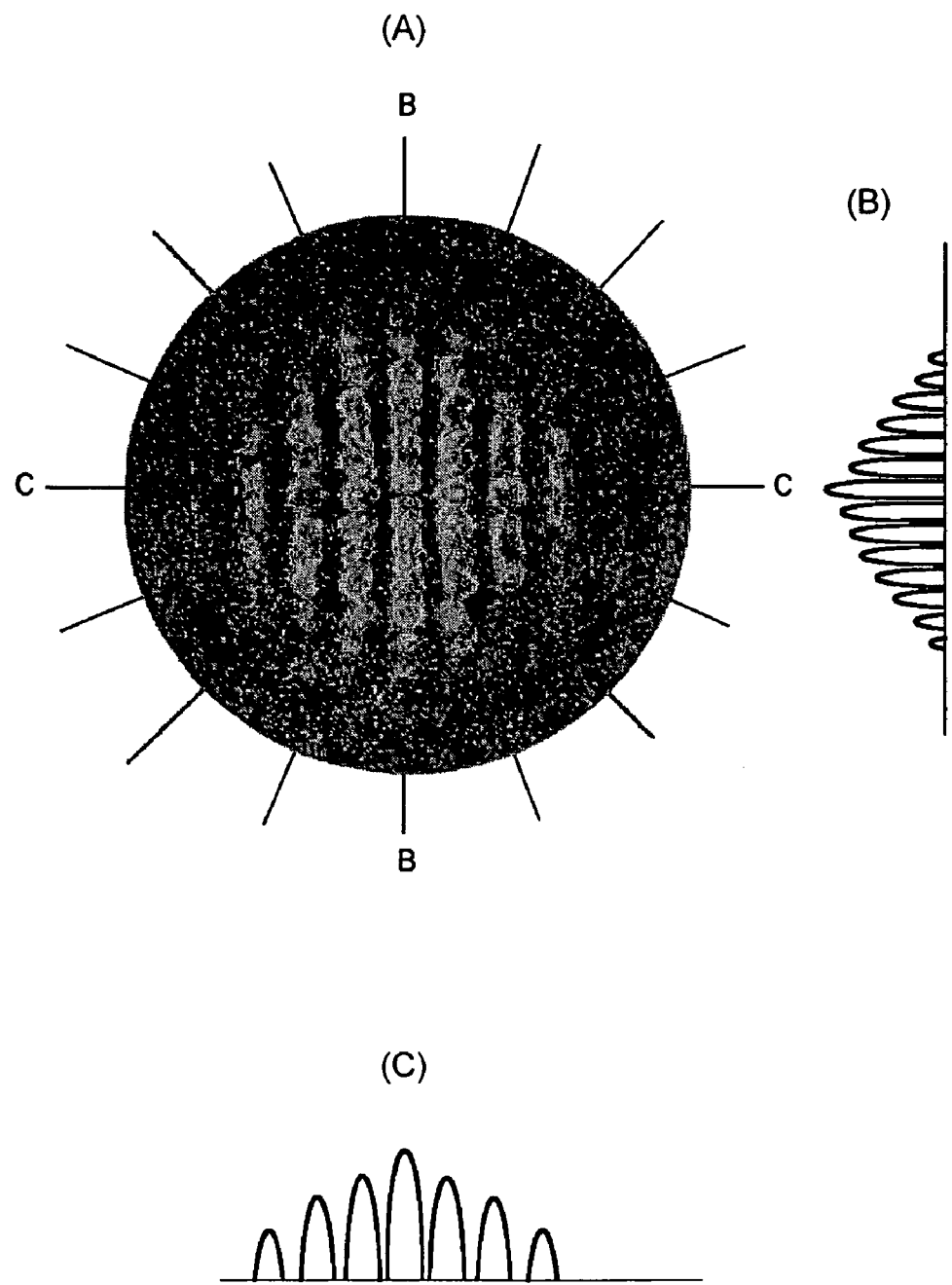
FIGS. 10(A) to 10(C) show light irradiation angle distribution on a light modulation panel by an illumination optical system using a conventional two-dimensional optical integrator.

FIGS. 10(A) to 10(C) show incident angle distribution of rays subjected to an optical integration operation by a conventional pair of two-dimensional fly eye lens arrays on an illumination surface such as a modulation surface of a light modulation panel. In FIG. 10(A), the outer periphery of a circle corresponds to azimuth angles of 360 degrees, and radial axes show elevation angles (angles of incidence) with respect to the normal to the illumination surface (a perpendicular incident axis). In FIG. 10(A), the outer periphery is divided by the radial axes in elevation angles of 20 degrees. FIGS. 10(B) and 10(C) show light intensity distribution taken along a line B—B and a line C—C in FIG. 10(A), respectively.

On the other hand, FIGS. 9(A) to 9(C) show incident angle distribution of rays provided by the illumination optical system of the present embodiment on an illumination surface such as a modulation surface of a light modulation panel. In FIG. 9(A), the outer periphery of a circle corresponds to azimuth angles of 360 degrees, and radial axes show angles of incidence on the illumination surface. In FIG. 9(A), the outer periphery is divided by the radial axes in elevation angles of 20 degrees. FIGS. 9(B) and 9(C) show light intensity distribution in a B—B section direction (B—B axis direction corresponding to a first axis direction) and a C—C section direction (C—C axis direction corresponding to a second axis direction) in FIG. 9(A), respectively.

As can be seen from comparison between FIG. 9(A) and 10(A), the luminous flux irradiated to the illumination surface can have generally uniform light intensity distribution on the illumination surface in both cases. However, a large difference is found between them in incident angle characteristics of a luminous flux.

Specifically, as shown in FIG. 10(A), the illumination luminous flux subjected to the optical integration operation by the pair of two-dimensional fly eye lens arrays has symmetrical ray distribution in two directions of the azimuth on the illumination surface.

In contrast, in the present embodiment, as shown in FIG. 9(A), elevation angles in the optical integration direction (B—B section direction) vertical in FIG. 9(A) are similar to those in FIG. 10(A), while in the direction in which the light intensity conversion optics exert the effect (C—C section direction), no luminous fluxes are superimposed by the optical integration operation, so that elevation angles dependent on the angular magnification determined by the compression magnification of the beam compressor are provided with respect to the divergent angle of the luminous flux emitted from the lamp unit. Thus, the ray incident angle on the illumination surface can be significantly reduced in the direction in which the light intensity conversion optics exert the effect.

Specifically, in the intensity distribution of illumination light on the illumination surface varying depending on the deviation angle of the incident ray with respect to the normal to the illumination surface, a ratio $\alpha:\beta$ is an aspect ratio of 2:1 or higher, where $\alpha$ and $\beta$ represent angle widths at which light intensity reaches half of a peak value P (½P) in each of two (B—B axis and C—C axis) directions orthogonal to each other on the illumination surface.

More specifically, the angle width at which light intensity reaches half of the peak value on the B—B axis is twice or more the angle width at which the light intensity reaches half of the peak value on the C—C axis. Alternatively, the maximum value of the angle width at which the light intensity reaches half of the peak value in the B—B axis direction may be set to be twice or more the maximum value of the angle width at which the light intensity reaches half of the peak value in the C—C axis direction.

Description is hereinafter made for influences (advantages) exerted by the aforementioned characteristics on a projection display apparatus which employs the illumination optical system described above in Embodiment 2.

(Embodiment 2)

Figure 11:
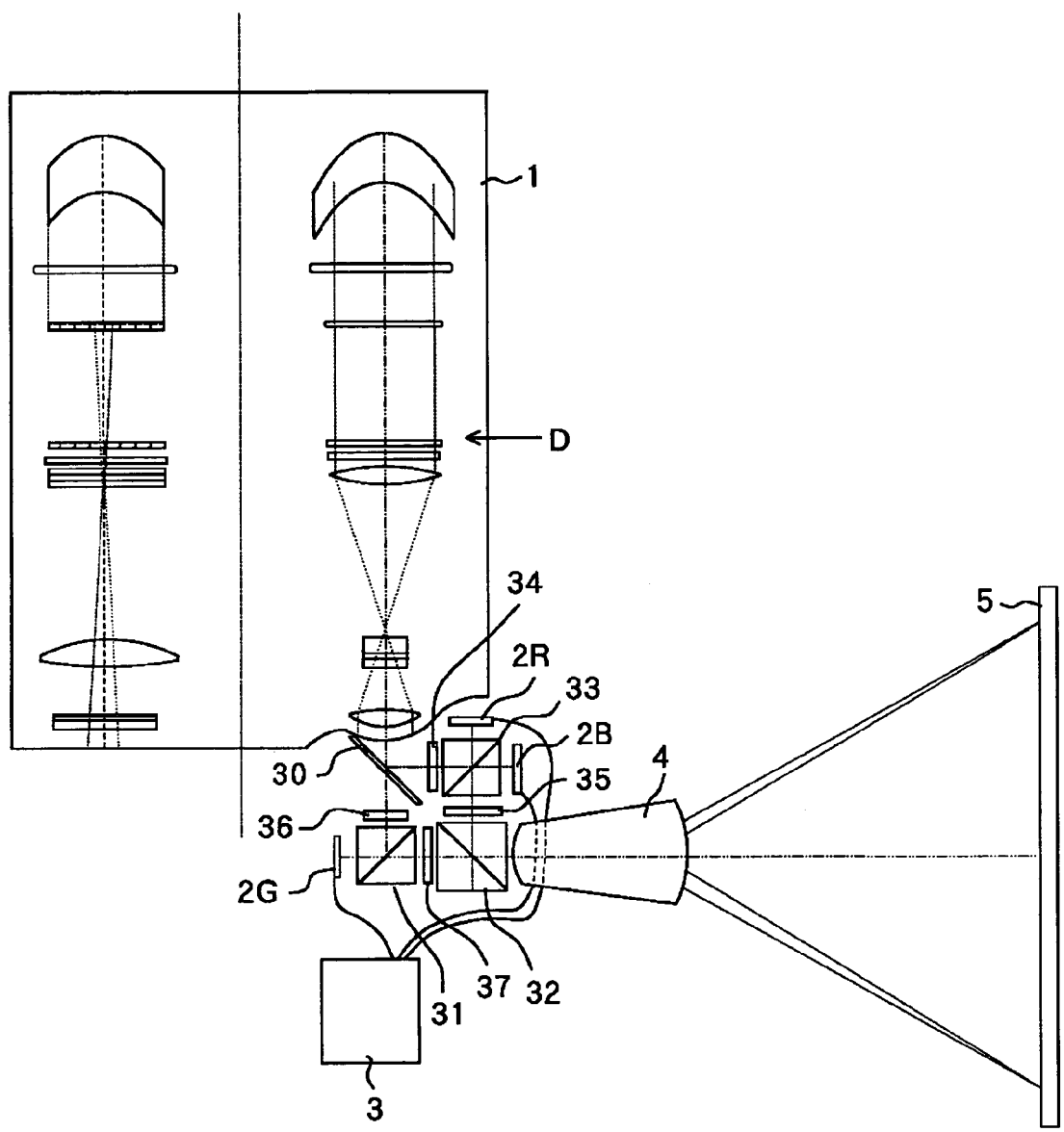
FIG. 11 is a schematic diagram showing the structure of a projection display apparatus which is Embodiment 2.

FIG. 11 shows the overall optical system in a projection display apparatus which is Embodiment 2 of the present invention.

In FIG. 11, reference numeral 1 schematically shows the illumination optical system described in Embodiment 1. A representation on the left in the frame in the figure shows the illumination optical system on the right viewed from an arrow D.

Reference numerals 2R, 2G, and 2B show reflection type liquid crystal modulation panels (hereinafter referred to as liquid crystal modulation panels) for read, green, and blue, respectively. Reference numeral 3 shows a light modulation panel driver which converts an external video input signal from an image information supply apparatus such as a personal computer, a television, a VCR, and a DVD player, not shown, into a driving signal for driving the liquid crystal modulation panels 2R, 2G, and 2B. Each of the liquid crystal modulation panels 2R, 2G, and 2B forms an original image with liquid crystal corresponding to the driving signal input thereto to reflect and modulate an illumination luminous flux incident on each of the liquid crystal modulation panels 2R, 2G, and 2B.

Of illumination light as linearly polarized light polarized in a direction orthogonal to the sheet of FIG. 11 from the illumination optical system 1, a light component of magenta (red and blue) is first reflected by a magenta splitting dichroic mirror 30 which reflects the light component of magenta and transmits a light component of green.

The reflected light component of magenta is incident on a blue cross color polarizer 34 which provides a phase difference of π for polarized light of blue. This produces a light component of blue which is linearly polarized light polarized in a direction in parallel with the sheet and a light component of red which is linearly polarized light polarized in the direction orthogonal to the sheet.

The blue light component and the red light component are incident on a polarization beam splitter 33 in which the blue light component that is P-polarized light is transmitted through a polarization splitting film of the polarization beam splitter 33 and guided to the liquid crystal modulation panel 2B for blue. The red light component which is S-polarized light is reflected by the polarization splitting film of the polarization beam splitter 33 and guided to the liquid crystal modulation panel 2R for red.

On the other hand, the green light component transmitted through the magenta splitting dichroic mirror 30 is transmitted through a dummy glass 36 for correcting an optical path length and incident on a polarization beam splitter 31.

The green light component which is S-polarized light incident on the polarization beam splitter 31 is reflected by a polarization splitting film of the polarization beam splitter 31 and guided to the liquid crystal modulation panel 2G for green.

In this manner, the respective liquid crystal modulation panels 2R, 2G, and 2B are illuminated by the corresponding color light components.

The illumination light components for the respective colors incident on the liquid crystal modulation panels 2R, 2G, and 2B (the linearly polarized light polarized in the direction orthogonal to the sheet) are given phase differences of polarization in accordance with the modulation state of a pixel group arranged in the liquid crystal modulation panels 2R, 2G, and 2B.

Of the modulated light emerging from the liquid crystal modulation panels 2R, 2G, and 2B, light components polarized in the same direction as the illumination light return toward the lamp unit along the optical path reversely to the illumination. Light components polarized in a direction orthogonal to the polarization direction of the illumination light reach a projection lens 4 as follows.

Specifically, the light modulated by the liquid crystal modulation panel 2R for red is converted into P-polarized light polarized in the direction in parallel with the sheet and is transmitted through the polarization splitting film of the polarization beam splitter 33. Next, the light is transmitted through a red cross color polarizer 35 which provides a phase difference of π for the polarized light for red, and is converted into a red light component as linearly polarized light polarized in the direction orthogonal to the sheet.

The red light component which has been converted into S-polarized light is incident on a polarization beam splitter 32, reflected by a polarization splitting film thereof, and directed toward the projection lens 4.

The light modulated by the liquid crystal modulation panel 2B for blue is converted into S-polarized light polarized in the direction orthogonal to the sheet and reflected by the polarization splitting film of the polarization beam splitter 33. Then, the light is transmitted through the red cross color polarizer 35 without being subjected to the effect of the polarizer 35 and incident on the polarization beam splitter 32.

The blue light component which is S-polarized light is reflected by the polarization splitting film of the polarization beam splitter 32 and directed toward the projection lens 4.

The light modulated by the liquid crystal modulation panel 2G for green is converted into P-polarized light polarized in the direction in parallel with the sheet and transmitted through the polarization splitting film of the polarization beam splitter 31. The light is transmitted through a dummy glass 37 for correcting an optical path length and incident on the polarization beam splitter 32. The green light component which is P-polarized light is transmitted through the polarization splitting film of the polarization beam splitter 32 and directed toward the projection lens 4.

The liquid crystal modulation panels 2R, 2G, and 2B are adjusted or mechanically or electrically compensated for such that predetermined pixels on the respective panels are relatively superimposed on a light diffusion screen 5 with high accuracy.

The three light components for the respective colors combined by the polarization beam splitter 32 are taken by the entrance pupil of the projection lens 4. The projection lens 4 is arranged to dispose a modulation surface of each liquid crystal modulation panel and a diffusion surface of the light diffusion screen 5 in an optically conjugate relationship. Thus, the light components for the respective colors combined by the polarization beam splitter 32 are transferred to the light diffusion screen 5 to project and display a full-color image corresponding to the video signal on the light diffusion screen 5.

The dichroic film of the dichroic mirror 30 used in the optical path for illuminating the liquid crystal modulation panels 2R, 2G, and 2B has the characteristic that, as a deviation amount of the incident angle of a ray from 45 degrees with respect to the dichroic film is increased, the splitting wavelength is shifted toward a shorter wavelength at an obtuse angle or toward a longer wavelength at an acute angle.

Thus, when the optical integrator implemented by the conventional pair of two-dimensional fly eye lens arrays is used in the illumination optical system, a luminous flux with the incident angle distribution as shown in FIG. 10(A) is incident on the dichroic film, so that luminous fluxes at different wavelengths coexist as the incident angle is deviated from 45 degrees with respect to the dichroic film.

If the lamp unit serving as the light source has gradual radiation energy wavelength distribution like blackbody radiation, the distribution of angles incident on the dichroic film is symmetric about 45 degrees, so that the average cut wavelength is not changed. However, when the lamp unit of electron excited radiation which uses gas exciting light emission is used as in the present embodiment, it has wavelength spectral distribution including emission lines as dominant parts in radiation energy wavelength distribution, and thus the average cut wavelength is changed with the median point. Therefore, color splitting by the dichroic films is not appropriately achieved to result in the disadvantage of poor color reproducibility in a projected image.

The polarization beam splitters 31, 32, and 33 used in the optical path for illuminating the liquid crystal modulation panels 2R, 2G, and 2B and the optical path for color combination are typical polarization beam splitters of a MacNeil type and have the polarization splitting films for S-polarized light and P-polarized light by means of the Brewster angle. As a deviation amount of the incident angle of a ray from 45 degrees with respect to the polarization splitting surface is increased, accuracy of splitting of S-polarized light and P-polarized light is suddenly reduced.

The accuracy of splitting of S-polarized light and P-polarized light can be actually maintained at a ratio of approximately 50:1 when a deviation amount from 45 degrees falls within approximately ±3 degrees. Thus, when the optical integrator implemented by the conventional pair of two-dimensional fly eye lens arrays is used, a luminous flux with the incident angle distribution as shown in FIG. 10(A) is incident on the polarization beam splitters 31 and 32. In addition, the luminous flux is incident on the polarization beam splitters 31, 32, and 33 after the reflection and polarization modulation by the liquid crystal modulation panels 2R, 2G, and 2B. This produces the disadvantage that, of luminous fluxes with a deviation amount of incident angle of ±3 degrees or more from 45 degrees with respect to the polarization splitting surface, a portion of P-polarized light is reflected, and a portion of S-polarized light is transmitted.

The illumination light incident on each of the liquid crystal modulation panels 2R, 2G, and 2B formed of reflection type liquid crystal display element is given a phase difference of polarization in accordance with the modulation state of pixels arranged in each of the liquid crystal modulation panels 2R, 2G, and 2B. However, even when the liquid crystal modulation panels 2R, 2G, and 2B send light which is not subjected to a change in phase difference to display black, a luminous flux inclined three degrees or more from 45 degrees with respect to the polarization splitting surface of the polarization beam splitters 31 to 33 includes a portion of S-polarized light which is transmitted and a portion of P-polarized light which is reflected and transferred to the light diffusion screen 5 through the projection lens 4. As a result, the intended black is displayed in gray to reduce illuminance contrast.

For the polarized light modulation characteristics of the liquid crystal modulation panels 2R, 2G, and 2B, when twisted nematic liquid crystal is used in the liquid crystal modulation panels, the liquid crystal modulation panels 2R, 2G, and 2B fundamentally have the characteristic that it cannot accurately modulate light incident on the reflection type liquid crystal modulation panels at an azimuth of 45 degrees. For this reason, in the optical integrator implemented by the conventional pair of two-dimensional fly eye lens arrays which illuminates light from azimuths generally axial symmetric, polarized light modulation of the liquid crystal is not sufficient, and intended black display is shown in gray to reduce illuminance contrast, similarly to the incident angle dependency characteristics of the polarization beam splitters 31 to 33 described above.

To address these disadvantages, the illumination optical system 1 of Embodiment 1 described above can be used to provide a luminous flux with the incident angle distribution as shown in FIG. 9(A). When the luminous flux is incident on the dichroic mirror 30, a deviation amount of the incident angle from 45 degrees with respect to the dichroic film falls within +3 to 4 degrees. This can almost eliminate inappropriate color combination due to the change in the average cut wavelength with the median point in the color splitting by the dichroic film to result in poor color reproducibility in a projected image occurring when the optical integrator implemented by the conventional pair of two-dimensional fly eye lens arrays is used.

When the luminous flux is incident on the polarization beam splitter 31 to 33, a deviation amount of the incident angle from 45 degrees with respect to each polarization splitting surface falls within ±3 to 4 degrees. This can almost eliminate a reduction in illuminance contrast due to the polarization splitting error which means that polarization splitting does not match the modulation state of the pixels in the liquid crystal modulation panel occurring when the optical integrator implemented by the conventional pair of two-dimensional fly eye lens arrays is used.

For the disadvantage in providing the phase difference for the modulation of polarized light depending on the incident angle on the reflection type liquid crystal modulation panel, since almost no components of illumination luminous fluxes are directed from an azimuth at which polarization modulation by the liquid crystal is not sufficiently achieved, a reduction in illuminance contrast can be almost eliminated.

The projection display apparatus of the present embodiment also provides an advantage in the projection lens 4. Specifically, when the polarization splitting direction or the wavelength splitting direction is set to the long side direction of the liquid crystal modulation panel, it is possible to set the horizontal direction with narrow illumination angle distribution shown in FIG. 9(A) to the direction in which the projection lens 4 has a large projection field angle. This can reduce the width of a luminous flux transmitted in a direction in which an aperture eclipse of the projection lens 4 called vignetting occurs. In other words, the advantage produces the effect of reducing vignetting due to the pupil aperture eclipse of the projection lens 4 to prevent a reduction in light amount at the edge of an image area projected on the light diffusion screen 5, thereby producing a projected image of uniform light intensity distribution.

It should be noted that, while the present embodiment descried above employs the reflection type screen to form the image display system, the screen may be of the reflection type or a transmission type. Specifically, when a screen with predetermined diffusion is used, a projection display apparatus can function to allow a user to directly view the screen 5 to recognize a projected image.

The structure of the projection display optical system described in Embodiment 2 described above is only illustrative, and the illumination optical system of the present invention is applicable to a projection display optical system other than Embodiment 2.

Each of Embodiments 1 and 2 has been described for the example which employs, as the optical integrator, the first cylindrical lens array homogenizer 206 and the second cylindrical lens array homogenizer 207 which perform splitting and recombination of the illumination luminous flux incident as the generally collimated luminous flux from the light source by using the lens array in the first axis direction (the vertical direction) on the section generally orthogonal to the traveling direction of the luminous flux, and as the light source, the discharge gas exciting arc tube (the light source lamp) 200 of the DC drive type. However, the present invention is applicable to a structure which employs, as the optical integrator, a two-dimensional lens array which performs splitting and recombination of an illumination luminous flux incident as a generally collimated illumination luminous flux from the light source in the first and second axis directions (the vertical and horizontal directions) on a section generally orthogonal to the traveling direction of the luminous flux, and as the light source, the discharge gas exciting arc tube (the light source lamp) 200 of the DC drive type.

As described above, according to Embodiments 1 and 2, in the illumination optical system which provides an illumination luminous flux with a small incident angle in one axis direction on a section of the illumination luminous flux, the discharge gas exciting arc tube of the DC drive type is used as the light source. This can maintain the characteristic of the illumination optical system of improving the polarization splitting (and recombination) properties in the polarization splitting (and recombination) element and the spatial light modulator on which the illumination luminous flux is incident, while the intensity distribution of the luminous flux toward the polarization conversion element can be prevented from enlarging, thereby making it possible to reduce a light amount blocked by the mask (that is, a reduction in light amount) provided for the polarization conversion element. It is thus possible to enhance light transfer efficiency of the illumination optical system which uses the polarization conversion element.

Such an illumination optical system can be used in a projection display optical system or a projection display apparatus to improve brightness of a projected image without increasing an amount of light emitted by the light source and to achieve a high contrast.

The illumination optical system of each of Embodiments 1 and 2 illuminates an illumination surface with a generally telecentric illumination luminous flux. In intensity distribution of illumination light on the illumination surface changing depending on a deviation angle of an incident ray with respect to a normal to the illumination surface, a ratio of angle widths at which light intensity reaches half of a peak value in each of two axis directions orthogonal to each other on the illumination surface is an aspect ratio of 2:1 or higher. Alternatively, in the illumination optical system, in intensity distribution of illumination light on the illumination surface changing depending on a deviation angle of an incident ray with respect to a normal to the illumination surface, the maximum value of the angle width at which light intensity reaches half of the peak value in one of the two axis directions orthogonal to each other on the illumination surface is twice or more the maximum value of the angle width at which light intensity reaches half of the peak value in the other direction.

With these structures and settings, it is possible to realize an illumination optical system which can use light from a light source with high efficiency and provide an illumination luminous flux with high uniform illuminance in addition to the aforementioned effects. The illumination optical system can be used in a projection display optical system to provide a projected image with high brightness and a high contrast.

While preferred embodiments have been described, it is to be understood that modification and variation of the present invention may be made without departing from the scope of the following claims.

What is claimed is:

1. An illumination optical system comprising:
   a light source which is a discharge gas exciting arc tube of a direct current drive type having a cathode electrode and an anode electrode, and has a light emission area being closer to the cathode electrode than the anode electrode;
   an optical integrator which uses a lens array to perform splitting of a luminous flux incident from the light source in a first axis direction in a two-dimensional section orthogonal to a traveling direction of the luminous flux;

a polarization conversion element which includes a polarization beam splitter array, a plurality of ½ wave plates, and a mask, the polarization beam splitter array having a plurality of polarization beam splitters arranged corresponding to a plurality of predetermined lens areas in the lens array, each of the ½ wave plates rotating a polarization direction of first polarized light substantially 90 degrees out of the first and second polarized light with polarization directions orthogonal to each other split by each of the polarization beam splitters, and the mask covering a plurality of areas out of incident surfaces of the polarization beam splitter array to prevent incident of the second polarized light on each of the ½ wave plates, each area covered by the mask and each of the ½ wave plates are opposed to each other on both sides of the polarization beam splitter array.

2. The illumination optical system according to claim 1, wherein the mask has light-transmitting portions, and a luminous flux transmitted through each light-transmitting portion of the mask has light intensity distribution in which light intensity in a substantially central portion thereof is the highest and the light intensity gradually becomes low toward a peripheral portion thereof.

3. The illumination optical system according to claim 1, wherein the illumination optical system illuminates an illumination surface in a generally rectangular shape, and the first axis direction is a short side direction of the illumination surface.

4. The illumination optical system according to claim 1, further comprising optical intensity converting member for converting light intensity distribution in a second axis direction orthogonal to the first axis direction on the two-dimensional section.

5. The illumination optical system according to claim 1, wherein the illumination optical system illuminates an illumination surface with a generally telecentric luminous flux, and light intensity of the luminous flux on the illumination surface varies depending on a deviation angle of an incident ray with respect to a normal to the illumination surface, and the illumination optical system illuminates the illumination surface such that, in the light intensity distribution, a ratio of angle width at which light intensity reaches half of a peak value in each of two axis directions orthogonal to each other on the illumination surface is an aspect ratio of 2:1 or higher.

6. The illumination optical system according to claim 5, wherein, in the light intensity distribution, a ratio of an angle width at which light intensity reaches half of a peak value in a second axis direction orthogonal to the first axis direction to an angle width at which light intensity reaches half of a peak value in the first axis direction is an aspect ratio of 2:1 or higher.

7. The illumination optical system according to claim 1, wherein the illumination optical system illuminates an illumination surface with a generally telecentric luminous flux, and light intensity of the luminous flux on the illumination surface varies depending on a deviation angle of an incident ray with respect to a normal to the illumination surface, and in the light intensity distribution, a maximum value of an angle width at which light intensity reaches half of a peak value in one of two axis directions orthogonal to each other on the illumination surface is twice or more a maximum value of an angle width at which light intensity reaches half of a peak value in the other direction.

8. The illumination optical system according to claim 7, wherein, in the light intensity distribution, a maximum value of an angle width at which light intensity reaches half of a peak value in a second axis direction orthogonal to the first axis direction is twice or more a maximum value of an angle width at which light intensity reaches half of a peak value in the first axis direction.

9. A projection display optical system comprising: the illumination optical system according to claim 1; a spatial light modulator which modulates a luminous flux emerging from the illumination optical system by a group of pixels arranged two-dimensionally; and a projection lens which projects the luminous flux modulated by the spatial light modulator onto a projection surface.

10. A projection display apparatus comprising:
a light source which is a discharge gas exciting arc tube of a direct current drive type having a cathode electrode and an anode electrode, and has a light emission area being closer to the cathode electrode than the anode electrode;

an optical integrator which uses a lens array to perform splitting of a luminous flux incident from the light source in a first axis direction in a two-dimensional section orthogonal to a traveling direction of the luminous flux;

a polarization conversion element which includes a polarization beam splitter array, a plurality of ½ wave plates, and a mask, the polarization beam splitter array having a plurality of polarization beam splitters arranged corresponding to a plurality of predetermined lens areas in the lens array, each of the ½ wave plates rotating a polarization direction of first polarized light substantially 90 degrees out of the first and second polarized light with polarization directions orthogonal to each other split by each of the polarization beam splitters, and the mask covering a plurality of areas out of an incident surface of the polarization beam splitter array to prevent incident of the second polarized light on each of the ½ wave plates;

a spatial light modulator which modulates a luminous flux emerging from the illumination optical system by a group of pixels arranged two-dimensionally; and a projection lens which projects the luminous flux modulated by the spatial light modulator onto a projection surface, each area covered by the mask and each of the ½ wave plates are opposed to each other in both sides of the polarization beam splitter array.

11. An image display system comprising: the projection display apparatus according to claim 10; and a screen which forms the projection surface, wherein the image display system allows an observer to observe a projected image with one of divergent reflection light from the screen and divergent transmission light through the screen, each light having predetermined directivity.

12. An illumination optical system comprising:
a light source in which a cathode electrode and an anode electrode are provided, and by applying a direct current voltage a discharge gas is excited and light is emitted continuously from an area being closer to the cathode electrode than the anode electrode;

a lens array in which a plurality of lenses are arranged in a first direction substantially orthogonal to an illumination direction, each lens condensing a part of a luminous flux from the light source in the first direction;

a mask in which light-transmitting portions transmitting luminous fluxes condensed by the lenses and light-blocking portions blocking the luminous fluxes condensed by the lenses are arranged alternately in the first direction;

a polarization beam splitter array in which first polarization beam splitters and second polarization beam splitters are arranged alternatively in the first direction, each first polarization beam splitter reflecting a first polarized light out of transmitted light through the light-transmitting portion and transmitting a second polarized light out of the transmitted light the polarization direction of the second polarized light being rotated by substantially 90 degrees from the polarization direction of the first polarized light, each second polarization beam splitter reflecting the first polarized light reflected by the first polarization beam splitter in a direction substantially parallel to the transmitting direction of the second polarized light; and a plurality of wave plates which rotate the polarization direction of the transmitted light substantially 90 degrees, and are provided such that the polarization direction of the second polarized light from the first polarization beam splitters and the polarization direction of the first polarized light from the second polarization beam splitters are aligned with each other, wherein each light-blocking portions of the mask and each of the wave plates are opposed to each other on both sides of the polarization beam splitter array.

13. A projection display apparatus comprising:

a light source in which a cathode electrode and an anode electrode are provided, and by applying a direct current voltage a discharge gas is excited and light is emitted continuously from an area being closer to the cathode electrode than the anode electrode;

a lens array in which a plurality of lenses are arranged in a first direction substantially orthogonal to an illumination direction, each lens condensing a part of a luminous flux from the light source in the first direction;

a mask in which light-transmitting pardons transmitting luminous fluxes condensed by the lenses and light-blocking portions blocking the luminous fluxes condensed by the lenses are arranged alternately in the first direction;

a polarization beam splitter array in which first polarization beam splitters and second polarization beam splitters are arranged alternatively in the first direction, each first polarization beam splitter reflecting a first polarized light out of transmitted light through the light-transmitting portion and transmitting a second polarized light out of the transmitted light, the polarization direction of the second polarized light being rotated by substantially 90 degrees from the polarization direction of the first polarized light, each second polarization beam splitter reflecting the first polarized light reflected by the first polarization beam splitter in a direction substantially parallel to the transmitting direction of the second polarized light;

a plurality of wave plates which rotate the polarization direction of the transmitted light substantially 90 degrees and are provided such that the polarization direction of the second polarized light from the first polarization beam splitters and the polarization direction of the first polarized light from the second polarization beam splitters are aligned with each other, a light modulator which modulates incident light; and a projection optical system which projects modulated light by the light modulator, wherein each light-blocking portions of the mask and each of the wave plates are opposed to each other on both sides of the polarization beam splitter array.

14. An image display system comprising:

the projection display apparatus according to claim 13; and a screen which has a projection surface.

* * * * *